United States Patent [19]

Woolfson

[11] 4,364,089

[45] Dec. 14, 1982

[54] BINARY CORRELATION VIDEO TRACKER

[75] Inventor: Martin G. Woolfson, Baltimore, Md.

[73] Assignee: Westinghouse Electric Corp., Pittsburgh, Pa.

[21] Appl. No.: 89,688

[22] Filed: Oct. 31, 1979

[51] Int. Cl.$^3$ .............................................. H04N 7/18
[52] U.S. Cl. .................................... 358/125; 358/126
[58] Field of Search ............................. 358/125, 126; 250/203 R, 203 CT

[56] References Cited

U.S. PATENT DOCUMENTS

| 3,829,614 | 8/1974 | Ahlbom et al. | 358/126 |
| 3,865,974 | 2/1975 | Alpers | 358/125 |
| 3,903,357 | 9/1975 | Woolfson et al. | 358/126 |

Primary Examiner—Theodore M. Blum
Attorney, Agent, or Firm—W. E. Zitelli

[57] ABSTRACT

A binary correlation video tracker and a video preprocessor included therein, which function cooperatively to form binary patterns of values for the picture elements (pixels) in a predetermined pixel array of each of a plurality of frames of video gray level information generated by an electro-optical sensor, is disclosed. Histograms are formed for selected pixel arrays in the predetermined array of a video frame in accordance with a set of predetermined gray level values. The formed histograms are combined in accordance with a discriminant function to form a composite histogram from which at least one gray level value of the set is selected. Those pixels of the predetermined array which have gray level values corresponding to the selected at least one gray level value are assigned one of two predetermined values, the other pixels being assigned the other of the two predetermined values, whereby a binary pattern of values for the predetermined pixel array is formed. Accordingly, the video tracker selects a reference binary pattern of pixels from the formed binary pattern of the predetermined pixel array of one video frame. The selected reference binary pattern is used for performing auto and cross-correlation operations in the video tracker in accordance with a binary correlation coefficient function. In the cross-correlations, another reference binary pattern of pixels and position thereof in the predetermined array is derived for each of the video frames generated subsequent the one video frame, the results being used in the computation of tracking errors in the video tracker. In the auto correlations, a maximum autocorrelation value is derived for use in determining when the reference binary pattern may be updated with the another reference binary pattern for further binary correlation processing.

12 Claims, 18 Drawing Figures (BACKGROUND)

(BACKGROUND)

(BACKGROUND)

BINARY CORRELATION VIDEO TRACKER

BACKGROUND OF THE INVENTION

The present invention relates broadly to video correlation trackers, and more specifically to one which preprocesses video frame data of an electro-optical sensor into histograms based on a predetermined set of gray level values from which binary patterns of a predetermined array of the video frames are formed for use in correlation operations of the tracker for establishing the tracking servo errors with which to govern an optical system which guides the line-of-sight path of the electro-optical sensors.

In a typical video correlation tracker, such as that shown in the block diagram functional schematic of FIG. 1, a conventional gimbaled optical system 20 guides the line-of-sight LOS denoted as a dashed line projected from a target to the field of view of an electro-optical sensor 22, which may be a conventional TV camera, for example. In most cases, the optical system 20 is electromechanically controlled by a set of gimbal servos 24. The TV frame information from the sensor 22 may be provided over signal line 23 to an analog-to-digital converter 26 which is part of the video correlation tracking control electronics 28.

A predetermined portion of the field of view of the sensor 22, more commonly known as the track window, may be partitioned into pixels by the A/D converter 26 and indexed in a pixel memory 30 in accordance with the standard raster scanning of the sensor 22. An example of this pixel partitioning and indexing is shown in FIG. 2A wherein the gray level content of each pixel is denoted as P and the subscripts i, j designate the row, column position in the track window array of pixels. For example, the gray level of the upper left hand corner pixel of the track window of FIG. 2A is denoted as $P_{0,0}$; and in the bottom left hand corner the gray level of the pixel is denoted as $P_{31,0}$. The example of FIG. 2A describes a track window containing a 32×32 array of pixels, but it is understood that the track window array may be any prespecified number of pixels.

The conventional tracker A/D converter 26 may additionally convert the gray level pixel data into digital form for storage in a digital storage medium, such as a random access memory RAM, for example. The pixel information of each video frame for the purposes of the typical embodiment of FIG. 1 is stored in the conventional pixel memory 30 for signal processing by a signal processor such as that shown at 32. The signal processor 32 typically determines the position within the track window of a predetermined reference subarray of pixels such as that shown in FIG. 2B, for example. The position of the reference subarray of pixels is normally denoted by the pixel index i, j of the upper left hand corner pixel therein. This reference array is generally established in an acquisition frame and used for correlation operations by a correlator unit 34 in subsequent tracking frames. In most video trackers, the signal processor 32 in conjunction with the correlator unit 34 also determine when the reference subarray of pixels within the track window should be updated so that tracking of the target image will not be lost. Correlation information is normally passed on to a conventional tracker unit 36 wherein typically azimuth and elevation tracking errors may be derived for governing over signal lines 37 the gimbal servos 24 to control the optical system 20 to keep the line-of-sight of the target image within the field of view of the electro-optical sensor 22, for example.

In Applicant's copending application bearing Ser. No. 802,086 filed May 31, 1977 entitled "Apparatus and Method for Preprocessing Video Frame Signals" and assigned to the same assignee as the present application, the signal processor classifies the pixel of the pixel memory for each TV frame as a function of their gray level values. A pixel of an inner array which may be the reference array as shown in FIG. 2B may be grouped as one portion of pixels and the pixels in the annulus surrounding the reference array may be denoted as an outer portion of pixels. Gray level classifications are then performed individually for both the inner and outer portions of pixels for the video information of each TV frame. A statistical discriminate function based on contrasting pixel mass intensity for each of the assigned gray level classifications separates the pixels into modes or groups of consecutive gray level values. Certain modes of gray levels are selected generally as a result of the contrast polarity. Using the measured velocity of the aircraft in which the video correlation tracker is disposed generally derived by an inertial navigation system of the aircraft, the selected gray level modes may often be partitioned in one of either a target set or a background set. Those pixels which are determined to reside in the target set retain their measured video gray level content. All other pixels in the track window are provided with a predetermined gray level value for contrast purposes. The entire digitized gray level code for each of the identified pixels of the target set is used in the correlation operations of the correlator 34 for determining the best match position array of pixels in the subsequent frames of TV information.

In these type video trackers, very complex image matching metric functions are normally used in the correlator 34 while performing auto and cross correlations for providing information to the tracker unit 36 for determining the tracking azimuth and elevation errors and in addition, for determining when an update of the target reference array of pixels may be required. A second copending U.S. application of the Applicant, bearing Ser. No. 944,523, filed Sept. 21, 1978 entitled "An Adaptive Updating Processor For Use In An Area Correlation Video Tracker" and assigned to the same assignee as the present invention, may be used as a reference to illustrate the complexity involved for the auto and cross correlation operations performed in a correlator utilizing the entire digital code of each of the target pixels with respect to the digital codes of the pixels within the track window of the subsequent video frames. Image matching metric functions like the minimum sum of absolute differences, sometimes referred to as MAD, and the compression of partial row and column sum formations are just a few of the many which may be used in the correlations of a conventional video correlation tracker.

It is understood that for some video tracking applications these very precise and complex calculations for the correlation type trackers are necessary to maintain a stabilized image in a scene track. Therefore, it was not hard to justify the amount of hardware and consequently body weight used, and the amount of power consumed by the electronics. Even the amount of derivation calculation time of the correlator in connection with deriving the position of the predetermined reference array of pixels in the tracking frames of video information was warranted. However, for other applications of video correlation trackers such as in remotely powered aircraft and missiles, for example, it has been identified in some cases that the tracking requirements may not be as extreme. In these applications, a video tracker may automatically direct the optical system gimbals thereof to targets on the ground from the airborne craft. In a tracking mode, it may be adequate to have the video tracker merely maintain an image of a prespecified area of the ground within the field of view of the electro-optical sensor which is located on the moving craft.

Apparently, then for purposes of these applications, a reduction in the computational hardware and thus body weight and a reduction in the power consumed would be desirable. In fact, an overall simplification of the correlation procedures so that a more simple video tracker one which would satisfy all the requirements of tracking a ground target from a remotely powered aircraft or vehicle, appears almost necessary to permit visual area correlation trackers to be viable alternative to other types of trackers in competition therewith. Applicant's invention which will be more fully disclosed herebelow is one of a more simplified video correlation tracker for such applications as described hereabove.

SUMMARY OF THE INVENTION

In accordance with the broad principles of the present invention, a binary correlation video tracker and a video preprocessor included therein function cooperatively to form binary patterns of values for the picture elements (pixels) in a predetermined pixel array of each of a plurality of frames of video gray level information generated by an electro-optical sensor. A binary pattern of values for the pixels of the predetermined array of the video frame is formed by distributing the pixels of a selected array within the predetermined array into a first gray level histogram based on a predetermined set of gray level values and by distributing the pixels of at least one other selected array within the predetermined array into a second gray level histogram based on the same set of predetermined gray level values. At least one gray level value of said predetermined set is selected based on a discriminate function of the first and second gray level histogram distributions. One of two predetermined values is assigned to those pixels in the predetermined array of the video frame which have a selected gray value and the other of the two predetermined values is assigned to those pixels in the predetermined array of the video frame which have an unselected gray level value, whereby a binary pattern of values are formed for the pixels in the predetermined array of the video frame. This process may be repeated for each generated video frame of gray level information to form a binary pattern for the pixels in the predetermined array thereof.

Furthermore, the video tracker selects a reference subarray binary pattern of pixels from the predetermined pixel array of one frame and correlates it with the formed binary patterns of the predetermined pixel arrays of generated video frames subsequent the one frame based on a binary correlation coefficient function. The results of the binary pattern correlations are used for generating the tracking errors which govern a tracking servo means to control the guidance of an optical system for guiding the line of sight of a predetermined target image to within the field of view of the electro-optical sensor.

More specifically, the one and at least one other selected arrays within the predetermined array of a video frame are preferably disjoint, one being an inner array and the at least one other being the annulus of said inner array within the predetermined array. The pixel distributions of corresponding gray level values of the histograms of the selected inner and annulus arrays are subtracted to form a composite histogram of gray level values. Groups of consecutive gray level values of the formed composite histogram which have pixel difference values of one polarity are identified and at least one of the identified groups is selected, preferably the group which has a maximum pixel difference value with respect to the pixel difference values of the other identified groups. In one embodiment, the consecutive gray level values of the selected at least one identified group are extended to include all of the consecutively increasing and decreasing values on either side of the selected group which have a pixel difference value in a composite histogram of substantially zero.

In another aspect, if the determined maximum pixel difference value is less than a predetermined threshold value, the pixels of the distribution of the composite histogram may be accumulated starting at an initial gray level value and continuing consecutively through increasing gray level values until the accumulative number of pixels is greater than a predetermined number of pixels, preferably one half the maximum number of pixels in the predetermined array, the predetermined gray level value at the greater than occurrence being the selected gray level value for governing the assignment of the binary pattern.

In the binary correlation video tracker, a reference subarray binary pattern of pixels may be selected from the predetermined pixel array of one video frame and correlated with the formed binary patterns of the predetermined pixel arrays of generated video frame subsequent the one frame based on a binary correlation coefficient function. The correlation operations include cross correlating the formed binary pattern of the reference subarray with formed binary patterns of other subarrays of the predetermined pixel array of another video frame, which is generated subsequent the one frame, to identify another reference subarray and position thereof in the predetermined pixel array of the other video frame, a position difference between the reference and another reference subarrays in the predetermined array being used to generate the at least one tracking error by the tracking means. In addition, the correlation operations further include autocorrelating the formed binary pattern of the reference pixel subarray with the formed binary patterns of predetermined other pixel subarrays in the predetermined array of the one video frame and for autocorrelating the formed binary pattern of the identified another reference pixel subarray with the formed binary patterns of predetermined other pixel subarrays of the predetermined pixel array of the same video frame. A maximum autocorrelation value is rendered for each video frame as a result of the autocorrelations performed on the binary patterns of subarrays formed therefrom.

DESCRIPTION OF THE PREFERRED EMBODIMENT

Figure 3:
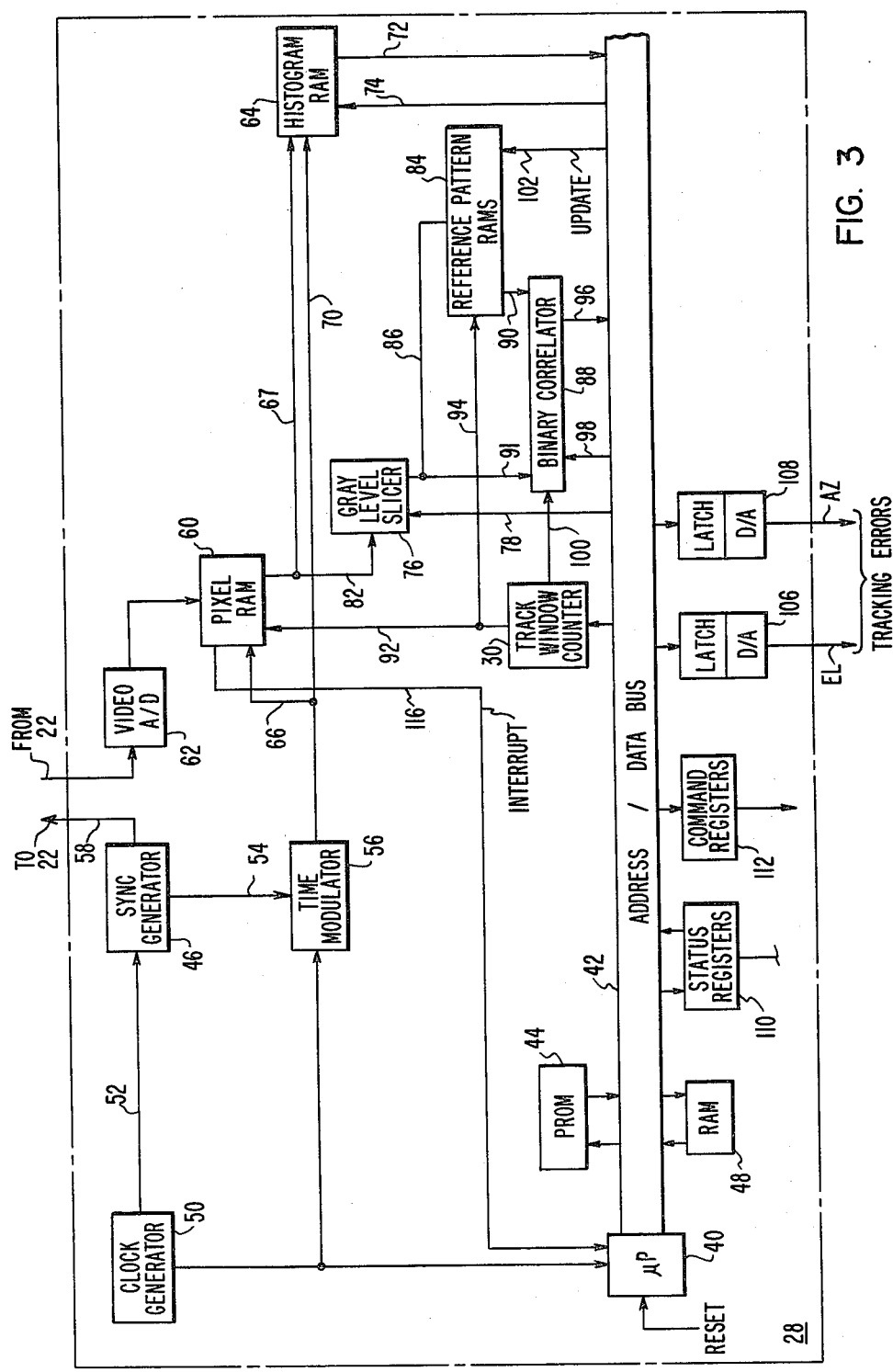
FIG. 3 is a schematic block diagram depicting in greater detail a binary video correlation tracker suitable for embodying the principles of the present invention.

In accordance with the preferred embodiment of the present invention, the correlation video tracking electronics of a video tracking system similar to that shown in FIG. 1 may be described in connection with the schematic block diagram as shown in FIG. 3. Referring to FIG. 3, the embodiment centers about a microprocessor 40 which may be of the type manufactured by the Intel Corporation, Model No. 8085A. The microprocessor system includes a standarized microprocessor bus 42 for use in conducting data to and from the microprocessor 40 in accordance with prespecified sets of operational programs which may be stored in a programmed read only memory (PROM) 44 which is coupled to the microprocessor bus 42. The operating instructions stored in the PROM 44 determines which video data may be accessed and how it will be processed as well as deriving servo tracking data outputs. Generally, parameters needed by or derived from the tracker electronics may be manipulated by means of the memory-mapped I/O structure thereof which may be essentially as synchronous to the operation of real-time or high speed microprocessor hardware.

The operating frequency of the electronic system is usually a function of a conventional TV sync generator shown at 46 as well as the operating frequency of the microprocessor 40. Usually a 504 kilohertz input may be needed to drive the TV sync generator 46. In addition, the clock period of the 8085A type microprocessor 40 should be equal to or exceed 160 nanoseconds. This may suggest a 6.048 megahertz clock frequency, but since several clock phases may be required for the various high speed random access memory (RAM) operation shown coupled to the microprocessor bus at 48, for example, an 18.144 megahertz oscillator may be chosen as the master clock frequency in the clock generator shown at 50. Therein and not shown in FIG. 3, the master clock signal may be divided by 12 to produce the 504 kilohertz input to the sync generator 46 over signal line 52. Several clock phases at 6.084 megahertz may be additionally produced by the clock generator 50 and may be used for the vertical and horizontal timing outputs of the sync generator 46 over signal line 54 to a conventional time modulator 56 to permit the tracker electronics to maintain phase lock to the TV raster scan. A mixed sync output 58 from the sync generator 46 to the TV sensor 22 itself phase locks its sync generator (not shown) to the electronic tracker sync generator 46, conpleting the fundamental TV/tracker synchronization.

Under the control of the microprocessor 40 in accordance with one set of the programmed instruction in the PROM 44, the time modulator 56 causes a pixel RAM 60 to store in the pixel RAM 60 a predetermined array (more commonly known as a track window) of pixel data gray level video information from a TV raster scanned image or more commonly called a frame. The predetermined array of pixels may be sized to a 32×32 pixel array, for example. In the present embodiment, the pixel gray level data may be sampled and digitized by a conventional A to D converter 62 and mapped from each video frame by the instructions of the PROM 44. The gray level pixel data video information may be stored conventionally in the pixel RAM 60 in accordance with prespecified indexed window subarrays as effected by decoding the raster scan address lines 66 supplied thereto from the time modulator unit 56.

Figure 4:
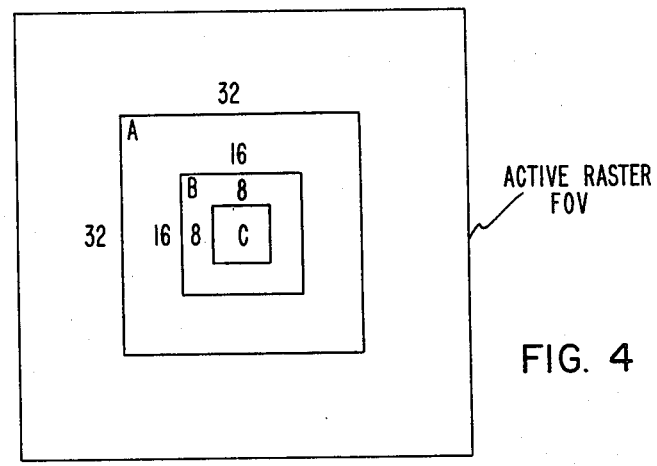
FIG. 4 illustrates a typical active raster field of view video frame having selected arrays A, B and C within a 32×32 predetermined track window pixel array thereof.

An example of a 32×32 predetermined window array of pixels within the active raster field of view (FOV) of the TV sensor 22 along with prespecified subarrays of 16×16 and 8×8 are shown in the diagram of FIG. 4. The inner window subarray, denoted at C, is comprised of all of the pixel elements in the 8×8 outlined array. Similarly, another prespecified subarray may be the annulus surrounding the subarray C within the 16×16 window area, denoted as B. It is understood that the pixel elements of both B and C may be combined to constitute one subarray for correlation purposes, this will be more fully understood from the more detailed description provided herebelow. Finally, a third prespecified subarray may be the pixels within the annulus of the 16×16 subarray (the combination of B and C) within the 32×32 track window, denoted as A, as shown in FIG. 4.

Histograms of the pixel data of the RAM 60 may be developed in a histogram RAM 64 in accordance with a set of predetermined gray level values. In the present embodiment, histograms may be formed for the three disjoint pixel subarrays A, B, and C such as that described in connection with the diagram of FIG. 4. The pixel gray level data may be provided to the histogram RAM 64 over signal line 68. Information concerning the position index of the pixels may be derived in the histogram RAM 64 from the raster scanning address lines 70 provided thereto from the time modulator 56. Histogram data from 64 is provided to and from the microprocessor 40 via the microprocessor bus 42 and the signal lines 72 and 74, respectively. The microprocessor 40 processes the histogram data from the RAM 64 to select at least one predetermined gray level value from the set of gray level values. The at least one selected gray level may be provided to a gray level slicer unit 76 over signal line 78 via the microprocessor bus 42.

In accordance with additional instructions of the PROM 44, the microprocessor 40 via the microprocessor bus 42 may govern the operation of a track window counter 80 to address the indexed pixel data from the RAM 60 over signal line 82 to the gray level slicer 76. Within the gray level slicer 76 each pixel conducted thereto is assigned one of two predetermined gray level values to form a binary pattern of gray level values for the predetermined array or track window of pixels in the RAM 60.

During one video frame, a reference subarray formed binary pattern of pixels may be conducted to one memory of a reference pattern RAM's unit 84 utilizing the signal lines 86. Once stored the reference binary pattern of pixels in the one memory of 84 may be used by a binary correlator 88 over signal lines 90 to perform autocorrelations and cross-correlations with the formed binary patterns of the pixels in the track window of the same and subsequent video frames. From each cross correlation, another reference binary pattern of pixels may be stored in another memory of the reference pattern RAM's 84 for correlation update purposes. During the binary correlation operations, respectively corresponding pixels of similar area pixel subarrays are compared to determine either similarities or dissimilarities in the formed binary values associated therewith. To facilitate this in a synchronous manner, address lines from the track window counter 80 may be provided to both the pixel RAM 60 utilizing signal lines 92 and to the reference pattern RAM's 84 utilizing signal lines 94. The results of the binary correlations may be provided to the microprocessor 40 via the microprocessor bus 42 over signal line 96. To further coordinate the activities of the binary correlator additional clocking information is provided thereto over signal line 100 from the track window counter 80, for example. For an update to occur in the reference pattern RAM's 84, an update signal 102 may be provided thereto over signal line 102 from the microprocessor 40 via bus 42.

Figure 1:
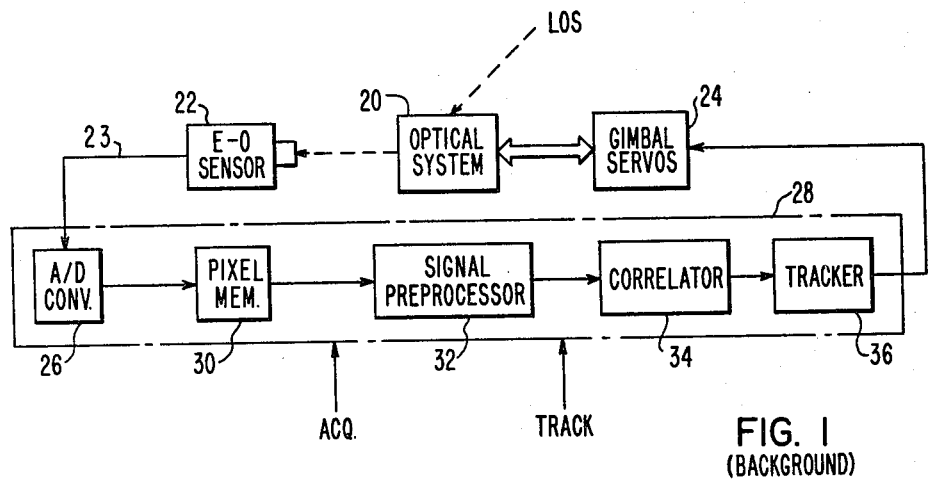
FIG. 1 is a block diagram schematic of a typical video correlation tracker.

In addition, with another set of programmed instructions from the PROM 44, the microprocessor 40 may process the binary correlation data to derive tracking errors which may be provided to the gimbal servos such as that shown at 24 in FIG. 1. For the present embodiment, the tracking errors are in terms of elevation and azimuth provided to the servos 24, for example, from the microprocessor 40 via bus 42 and I/O units 106 and 108, respectively. The I/O units 106 and 108 may be comprised of a digital latching register and a digital-to-analog circuit both being of a conventional design interfaceable with the microprocessor 40 bus 42 and operative in cooperation therewith. Additional information, such as the status of a number of parameters of the electro-optical system comprised of the units 22, 20 and 24, for example, may be supplied to the microprocessor 40 via bus 42 using a conventional I/O peripheral unit 110. Furthermore, desired commands from the microprocessor correlation electronics may be output to the electro-optical system utilizing a conventional I/O unit such as that shown at 112.

In the microprocessor embodiment of FIG. 3, the instructions preprogrammed in the PROM 44 may be periodically executed in accordance with periodic time interrupts. One such interrupt may be provided to the microprocessor 40 from signal line 116 generated from the pixel RAM 60. This interrupt signal may be generated as the pixel RAM 60 is filled with the track window video content of each frame. With each interrupt signal over signal line 116, the microprocessor 40 may go through its sequence of programmed instruction sets stored in the PROM 44 to process each new set of track window video information in the pixel RAM 60 coordinating the operations of the electronic units of 64, 76, 84, 80 and 88 coupled to the microprocessor bus 42. Temporarily formed digital data from the pixel processing may be stored in the conventional RAM 48 of the microprocessor system. This operational processing sequence will be more fully described herebelow in accordance with the flow charts of FIGS. 12A, 12B and 13.

Figure 5A:
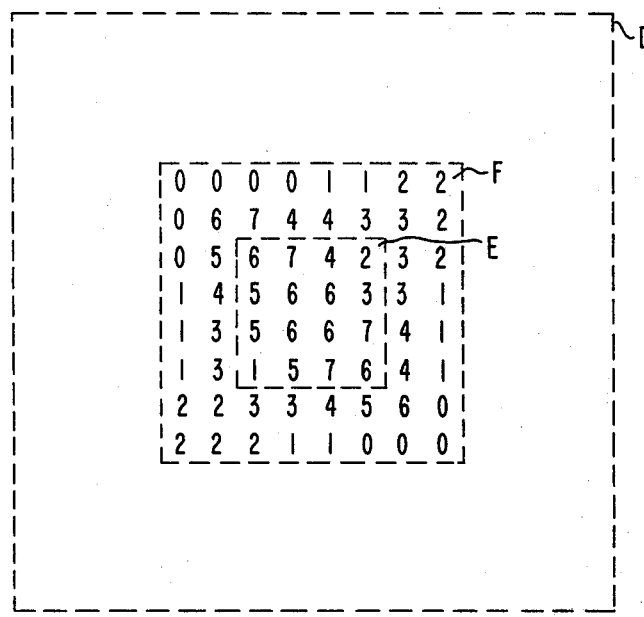
FIG. 5A depicts two arrays of partition pixels, F being an inner selected array and E being the annulus array surrounding said inner array within a defined square window area all within a video field of view frame D. The numerals within the partition pixels are representative of the gray level content thereof based on a scale of zero to seven.
Figure 5B:
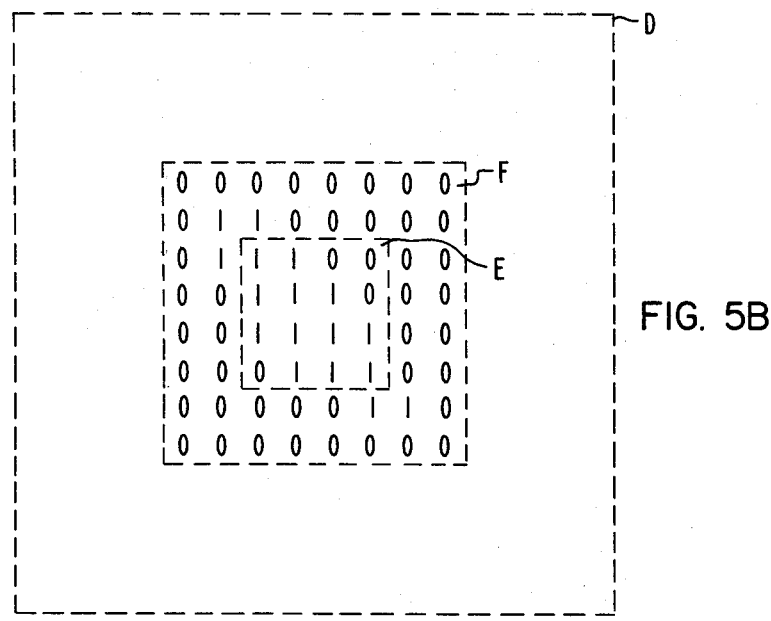
FIG. 5B is illustrative of the binary pattern of values which may be formed from the pixel gray level content exemplified in FIG. 5A.
Figure 6A:
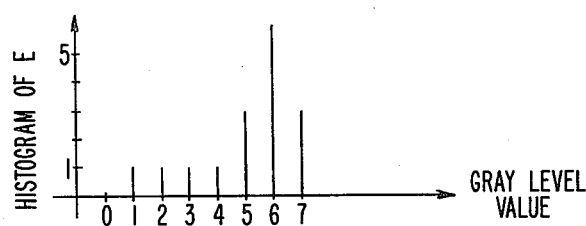
FIGS. 6A, 6B and 6C are exemplary histograms which may be developed from the gray level content of the pixel arrays E and F illustratively depicted in FIG. 5A.
Figure 6B:
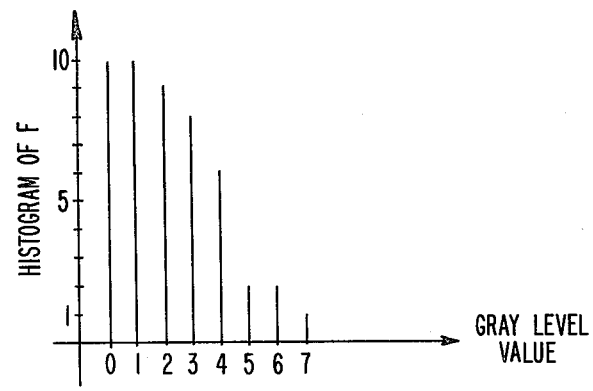
Figure 6C:
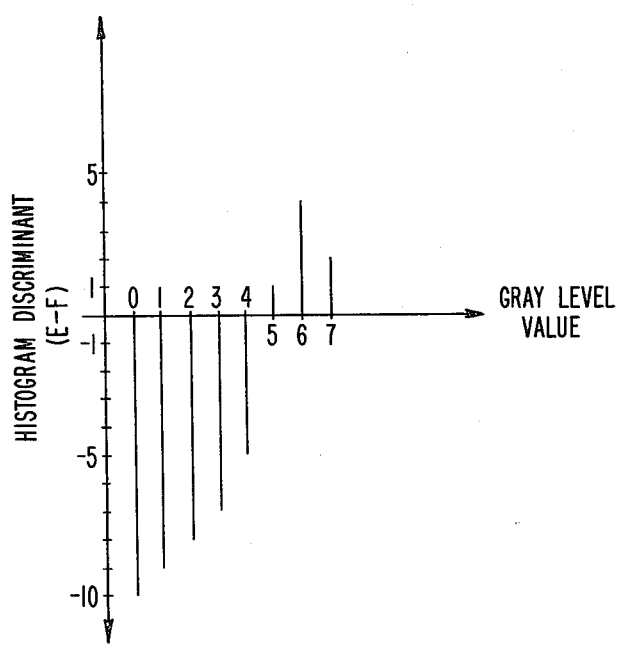

To more fully understand the histogram gray level processing occurring in the histogram RAM 64, reference is made to the FIGS. 5A and 5B and in addition the FIGS. 6A, 6B, and 6C. In FIG. 5A, two typical pixel subarrays E and F are shown in the field of view D of a video frame. The subarray E is comprised of a 4×4 array of pixels. The subarray F is comprised of the pixels in the annulus surrounding the subarray E in an 8×8 array of pixels. Within each pixel defined square is a numerical value from a predetermined set of integers zero to seven which denotes the gray level value of the pixel as determined by the A/D conversions at 62. As this pixel gray level information is addressed and conducted to the histogram RAM 64 over signal line 68, the pixels may be statistically distributed into a histogram defined by the predetermined set of gray level values 0 through 7. This is exemplary depicted in the histograms of FIGS. 6A and 6B. The histogram pixel distribution information of FIGS. 6A and 6B, for example, may be supplied to the microprocessor 40 via bus 42 and signal line 72 for processing. The processing may consist of an algorithm based on a contrasting histogram discriminate function for the purposes of deriving the gray level values of a target image.

For the present embodiment, the pixel content of the respective gray level values of the histogram F may be subtracted from the histogram E to form a new histogram E-F similar to that which is shown in FIG. 6C. In accordance with this same exemplary derivation, the target image may be determined as having the gray level values of 5, 6 and 7 which are the positive pixel distribution differences resulting from the subtraction discriminate function of histogram information. To facilitate the formation of the binary pattern of pixels, the gray level values representative of 5 through 7 may be provided to the gray level slicer 76 utilizing signal line 78. In gray level slicer 76, each of the pixels from the RAM 60 provided thereto over signal line 82 may be compared with the range of selected gray level values 5, 6, and 7. Those pixels which have gray levels wihin the selected target mode or range of gray level values may be assigned a one and those outside of the target mode of gray level values may be assigned a zero. The resulting binary pattern of pixels, such as that exhibited in FIG. 5B, may be utilized by the binary correlator 88 for binary correlation operations. In the examples described in connection with FIGS. 5A and 5B, the reference pattern of pixels may be chosen as that subarray E for example, for storage in one memory of the reference pattern RAM 84 for purposes of further binary correlation.

It is understood that that which has just been described in connection with FIGS. 5A and 5B and FIGS. 6A, 6B and 6C is a very simple example of the formation of a binary pattern by processing the video data contained in an inner region designated as the target window or target region in the track window and an annulus surrounding the target region which may be designated as the background region. These regions may be partitioned from the generated target window pixels during the raster scan of the sensor 22 utilizing the time modulator 56 and pixel RAM 60. However, it is understood that more than just two subarray regions may be used in the histogram preprocessing operations. An example of three subarray regions is shown in FIG. 4.

The histogram techniques may be described in broader terms using mathematical derivations by using the three disjoint regions A, B and C of FIG. 4, for example. Each histogram may be represented by the vectors $a_k$, $b_k$ and $c_k$ wherein each value is representative of the number of pixels in the corresponding disjoint region which have a gray value of k. In the microprocessor system embodiment of FIG. 3, the maximum number of pixels in each region may be limited to 255, and the predetermined set of gray level values may range from k=0 to k=15.

The basic heuristic employed according to the present embodiment may be: if a range of consecutive gray levels within a given inner region is such that the histogram pixel distribution value in that region is greater than the corresponding value in the annulus, then the range of gray level values (or gray level "slice") defines a target mode. Each pixel having a gray level within the slice is assigned a value of one, for example; pixels with values outside the slice are assigned the value zero, for example. If no positive differences are found, then the windows contain background data only. It is also possible for the vectors $b_k$ and $c_k$, for example, to be added together to form a new vector $d_k$ represented by the equation:

$$d_k = b_k + c_k,$$

which may be used as the inner region for the heuristic described above.

Each gray level slice heuristically defines a "mode" with the following notation which denotes only the number of pixels at each gray level j which relate to a positive comparison difference between the histogram A and the histogram B+C:

$$C_{kn}(a,d) = \{j/d_j > a_j; k \leq j \leq k+n\}. \tag{1}$$

The sum of all of the pixels in the gray levels j within the mode from k to k+n which is denoted as $S_{kn}(a,d)$, is given by $$S_{kn}(a,d) = \Sigma d_j. \tag{2}$$
$$j \in C_{kn}(a,d)$$

A selected target mode may be defined by the equation herebelow:

$$S_{max} = S_{kn}^*(a,d) \leq S_{jm}(a,d). \tag{3}$$

Also for a comparison between the regions B and C, $$S_{kn}(b,c) = \Sigma c_j \tag{4}$$
$$j \, C_{kn}(b,c).$$

Each vector is searched to determine $$S_{kn}^*(a,d) \text{ and } S_{jm}^*(b,c). \tag{5}$$

To compensate between the inner regions for the area difference between the comparison B with C and, between the outer annulus region A and the combined inner region B and C, a final comparison is made therebetween in accordance with the equation shown below:

$$S_{kn}^*(a,d) \text{ and } 4S_{jm}^*(b,c). \tag{6}$$

Hence, $$G_{lj}(u,v) = \begin{cases} C_{kn}(a,d) \; S_{kn}^*(a,d) \geq 4S_{jm}(b,c) \\ C_{jm}(b,c) \; S_{kn}^*(a,d) < 4S_{jm}(b,c) \end{cases} \tag{7}$$

Figure 7:
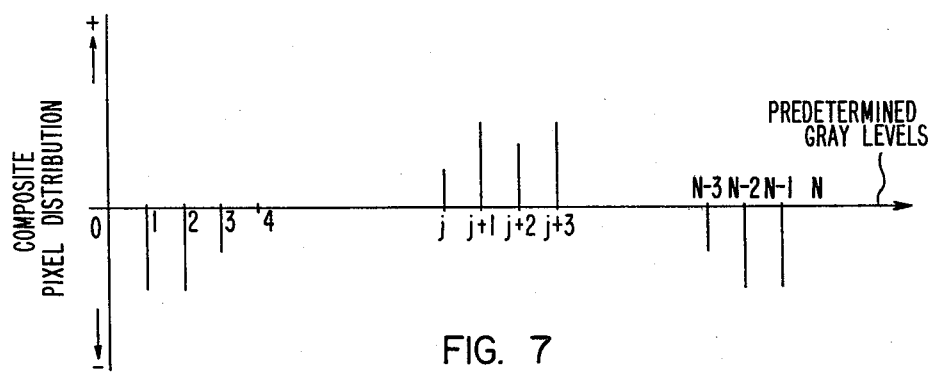
FIG. 7 is a histogram illustrating in general the composite contrasting distribution of pixels of a predetermined track window array based on N predetermined gray level values.

Suppose the difference of the histograms of C and B are plotted with a composite pixel distribution, as shown in FIG. 7. For this case, in accordance with the proposed heuristic, only one positive comparison difference mode is indicated at gray levels j to j+3. The negative modes $C_{12}$ and $C_{N-3,2}$ may be defined as background modes. Note that the selected target mode may be expanded such that a portion of the background may be included. Assume that all of the consecutively increasing and decreasing gray level values on either side of the selected mode of gray level values which have composite pixel distribution values of substantially zero are included as part of the selected target mode. Then, from FIG. 7, the j value may be expanded to the left to 4 and to the right to M=(N−4)−4=N−8. Hence, the expanded mode may be denoted as $C_{4,N-8}(b,c)$.

Should no target modes be found in the gray level comparison difference operation, the microprocessor 40 in accordance with preprogrammed instructions may revert to a background track provided that the background data within the B and C windows, for example, are not uniform. The binary pattern decision level may be found by forming the distribution function of the histogram data according to the following equation:

$$D_k = \min(255, D_{k-1} + b_k + c_k). \tag{8}$$

Figure 2A:
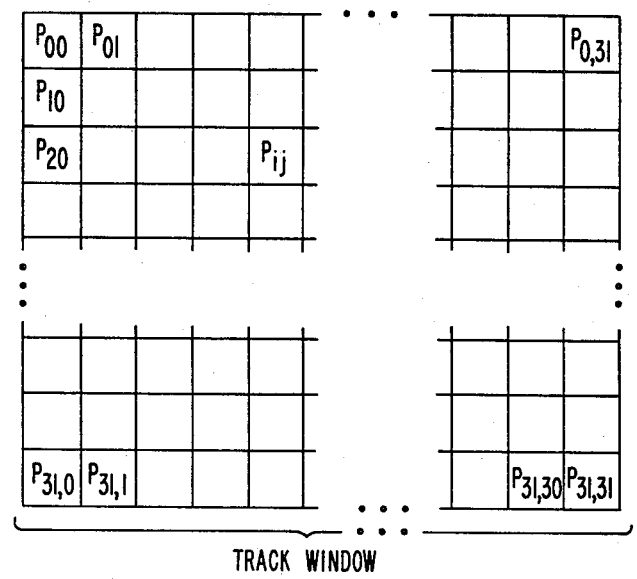
FIG. 2A depicts a typical indexed partitioning of the pixels in a 32×32 predetermined track window pixel array being part of a generated video frame from an electro-optical sensor.
Figure 2B:
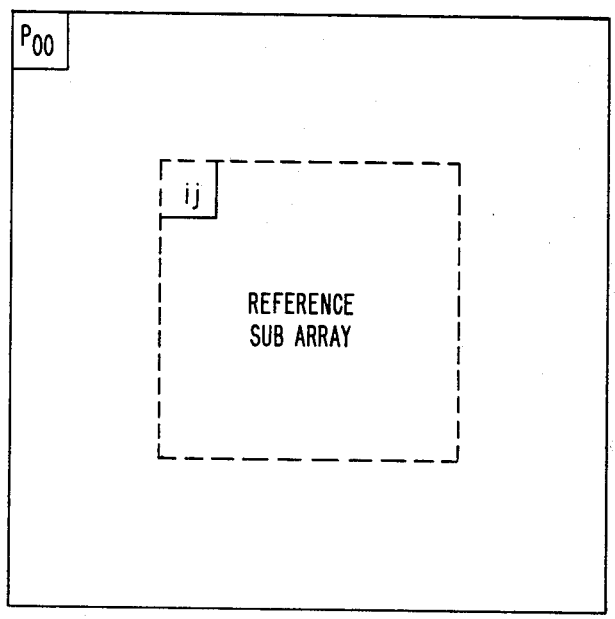
FIG. 2B graphically depicts the indexing of a predetermined reference subarray within the track window of a video frame.

If $D_k - X \geq 0$, then the decision level is gray level k. That is, the histogram values of the B and C windows, for example, may be accumulated until the sum exceeds a predetermined value X, which may be for the present embodiment one-half of the maximum number of pixels, say 128, for example. The decision threshold may be set to the particular value of k for which this decision occurs. In general, if $P_{ij}$ is an element of the $\times 32$ track window such as that shown in FIGS. 2A and 2B, then $$B_{ij} = \begin{cases} 1 & P_{ij} \geq k \; i,j = 1,2,\ldots,32 \\ 0 & \text{otherwise,} \end{cases} \quad (9)$$

where $B_{ij}$ is the resultant binary pattern.

Note that the gray level j having the value k and k+n may be the selected gray level values provided to the gray level slicer 76 over signal line 78. This will become more apparent from the more detailed description provided herebelow. In the case where no positive difference of the histograms is formed or the combined positive difference values are below a predetermined threshold, then only one gray level value k is provided to the gray level slicer 76.

In characterizing the binary correlator 88, suppose we consider a subarray of a binary pattern image which may be represented by an m×m binary matrix B, i.e., $$B_{ij} \epsilon [0,1]; i,j = 1,\ldots,m \quad (10)$$

Reordering the terms of this matrix permits a vector representation for the same pattern:

$$n = m^2; \quad (11)$$

$$k = j + (i-1)m; k = 1,\ldots,n; \quad (12)$$

and $$b_k = B_{ij}. \quad (13)$$

The vector $b_k$ is now of dimension n. Now suppose that the presence of a "0" in a given pattern bears as much information as the presence of a "1". Then, an equivalent representation can be formed by letting $$b_k \epsilon \{-1,1\}; k = 1,\ldots,n \quad (14)$$

This representation generates patterns of constant norm. That is, $$\text{norm}(b) = \|b\| = \sqrt{\sum_{k=1}^{n} b_k^2}; \quad (15)$$

but, $$b_k^2 = 1 \text{ and thus, } \|b\| = \sqrt{n}. \quad (16)$$

Now, let r and p be two n vectors such that $$r_k, p_k \epsilon \{-1,1\}; k = 1,\ldots,n. \quad (17)$$

The correlation coefficient between r and p, $\rho(r,p)$, may be defined by:

$$\rho(r,p) = \frac{\langle r,p \rangle}{\|r\| \|p\|} \quad (18)$$

where $$\langle r,p \rangle = \sum_{k=1}^{n} r_k p_k. \quad (19)$$

Now suppose $r_k = p_k$ for q of the n products, and
$r_k \neq p_k$ for n−q of the n products.
Then, for the number of binary "matches", $$\rho(r,p) = \frac{q - (n-q)}{n} = \frac{2q}{n} - 1. \quad (20)$$

Alternatively, if $x = n - q$, then for the number of "mismatches", $$\rho(r,p) = 1 - \frac{2x}{n} \quad (21)$$

In the embodiment, the pixel elements of a formed reference binary pattern and a formed input binary pattern may be, correlated by comparing the commonly indexed pixels of each binary pattern respectively bit by bit, serially, with an "exclusive OR" circuit. The output of this circuit may be accumulated in a digital counter, for example. After all the commonly indexed pixel elements of the reference binary pattern and input binary pattern have been compared, the counter may contain the number of mismatches. Hence, a subpattern within the track window of a same frame or a subsequent video frame which yields the minimum number of mismatches when compared to the reference binary pattern subarray is tantamount to determining patterns which yield maximum correlation.

Figure 8:
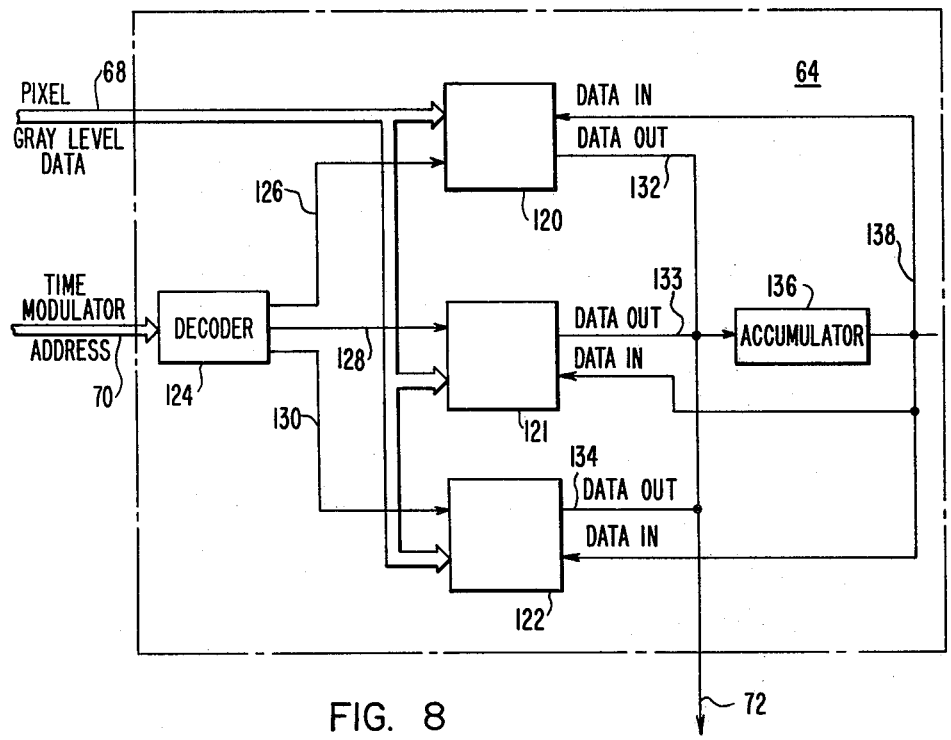
FIG. 8 is a block diagram schematic of a histogram RAM which may be suitable for use in the embodiment of FIG. 3.

More specifically, with regard to the histogram formations of the subdivided regions, the histogram RAM 64 may be embodied such as that shown in the block diagram schematic of FIG. 8. Referring to FIG. 8, a plurality of groupings of register arrays 120, 121 and 122 which may correspond to the pixel elements of the predetermined subarray regions like A, B and C described in connection with the typical track window pattern of FIG. 4. Each register of the memory arrays 120, 121 and 122 may correspond respectively to a predetermined gray level value such as that shown in the graphs of FIG. 6. The pixel gray level data over signal line 68 provided from the pixel RAM 60 may act as address inputs to the register arrays 120, 121 and 122, commonly. The time modulation address signals over line 70 may be decoded by a decoder unit 124 for enabling the operations of the register arrays 120, 121 and 122 with the signals 126, 128 and 130, respectively. The signals 126, 128 and 130 may be enabling when the pixel gray level data over signal lines 68 are respectively within the subarrays A, B and C. The data output lines 132, 133 and 134 of the register arrays may be connected together and provided to an accumulator 136 and provided to the signal line 72 which is coupled to the microprocessor bus 42. The output of the accumulator 136 denoted as 138 may be commonly fed back to the data inputs of the register arrays 120, 121 and 122.

In a typical operation, the decoder 124 determines from the time modulation address 70 in which subarray the gray level data information 68 is within and correspondingly enables the appropriate register array. The gray level data addresses a register in the enabled array of registers. the contents of the accessed register is provided to the accumulator 136 where it may be incremented by one. Within this same time slot the decoder 124 may cause the enabled accessed register to read in the incremented data from the accumulator 136 over the signal line 138. In this manner, the histograms such as those exemplary shown in FIG. 6 may be formed for a plurality of subarray regions. For each new video frame, once the histogram distributions are formed, the data is provided to the microprocessor 40 via microprocessor bus 42 over signal line 72 from each of the register arrays 120, 121 and 122 for further processing in accordance with the comparison discriminate function similar to that described hereabove.

Figure 9:
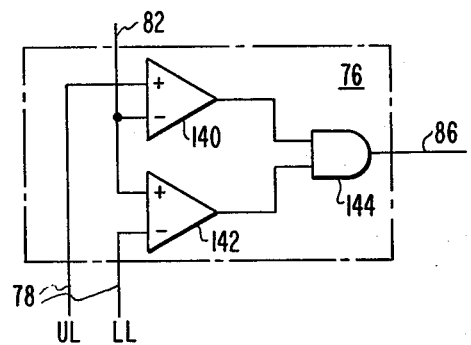
FIG. 9 is a functional schematic of a gray level slicer which may be suitable for use in the embodiment of FIG. 3.

A suitable embodiment for the gray level slicer 76 is shown by the functional block diagram schematic of FIG. 9. Referring to FIG. 9, two comparator functions 140 and 142 are provided having outputs which are coupled to two inputs of an AND gate 144. Signal line 82 may be coupled to the inverting input of comparator function 140 and the non-inverting input of comparator function 142. An upper limit UL signal from the group of signal lines 78 may be provided to the non-inverting input of comparator 140 and a lower limit LL signal of the signal lines 78 may be provided to the inverting input of the comparator function 142. The output of the AND gate 144 may be coupled to the signal line 86.

In operation, once the microprocessor 40 processes the histogram information and selects the outer limits of gray level values k and k+n, this information may be provided to the gray level slicer 76 over signal lines UL and LL to the comparators 140 and 142, respectively. As the pixel information is serially accessed over signal line 82 to the unit 76, a one is output over signal line 86 for each pixel having a gray level value substantially within the UL and LL limits. And, likewise, a zero is output over signal line 86 for each pixel having a gray level value outside of the specified limits. For the extreme case in which the discriminate function renders no positive comparison differences, and the selected gray level value k results from the integration of the number of pixels up to the predetermined value which may be one-half of the maximum number of pixels in the track window, for example. Then, the gray level k resulting from this technique may be provided to the unit 76 over the signal line LL, and a gray level value may be provided to the comparator 140 over line UL to cause the output thereof to remain a one through the duration of binary pattern formation.

Figure 10:
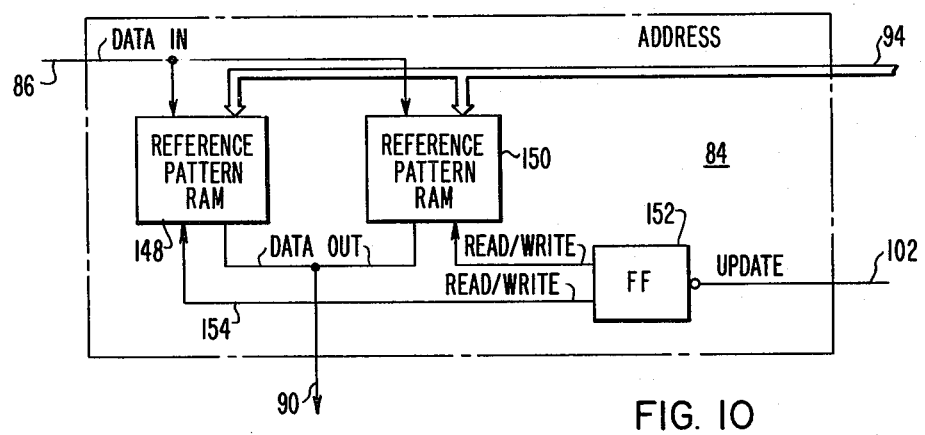
FIG. 10 is a block diagram schematic of reference pattern RAM's which may be suitable for use in the embodiment of FIG. 3.

A suitable embodiment of the reference pattern RAM's 84 is shown in FIG. 10. Referring to FIG. 10, two memory arrays 148 and 150 may be used to store the formed binary patterns of pixel subarrays for use in subsequent correlation processing by the correlator 88. Pixel data may be provided commonly to the memories 148 and 150 over signal line 86 from the gray level slicer 76. The registers within a selected one of the memories 48 and 150 may be accessed synchronously with the pixel binary pattern by the address information over the signal lines 94 provided thereto from the track window counter 80. Normally, only one of the memories 148 and 150 is enabled for reading data in and for writing data out in accordance with the outputs of an update flip-flop function 152. The outputs of the flip-flop 152 are governed by the update signal 102. The accessed data output signal from one or the other of the memories 148 and 150 is coupled to the signal line 90 which is provided to the binary correlator 88.

In a typical operation assuming that the reference pattern RAM 148 is enabled to read in data from the signal line 86 in accordance with the addressing information over signal line 94, the binary pattern of pixels of a selected subarray of the track window may be stored therein. This reference binary pattern of pixels of 148 may be enabled for readout over signal line 90 for binary correlation processing of the correlator 88. In subsequent video frames, another reference binary pattern of a pixel subarray may be determined from the cross correlation operation of the binary correlator 88. This subsequently determined binary pattern pixel subarray may be stored in the memory 150 in the same manner as previously described. If during the microprocessor operations, it is determined that the new reference binary pattern subarray of pixels in memory 150 is selected for use in the correlation processing of 88, an update signal is provided to the flip-flop 152 over signal line 102 to enable the memory 150 for use by the binary correlator 88. Thereafter, the binary pattern of pixel information of memory 150 is accessed therefrom over signal line 90 for use by the binary correlator 88 for subsequent binary correlation operations. Similarly, a new reference subarray binary pattern of pixels may be stored in the memory 148 for potential future use.

Figure 11:
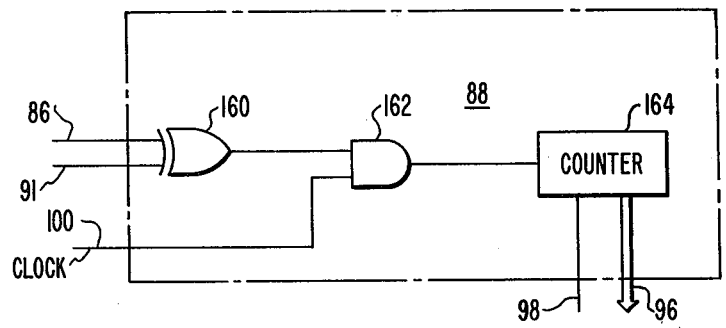
FIG. 11 is a schematic diagram of a binary correlator which may also be suitable for use in the embodiment of FIG. 3.

An embodiment suitable for use as the binary correlator 88 is shown in FIG. 11. The signals 86 and 91 may be provided to an exclusive OR function 160. The clock signal 100 from the track window counter 80 may be provided to one input of an AND function 162, the other input of which is coupled to the output of the gate 160. The output of the gate 162 is provided to the input of a binary digital counter 164. The contents of the counter 164 may be provided to the microprocessor via bus 42 and signal lines 96. And, in turn, a means for resetting the digital counter 164 to zero is provided thereto over signal line 98 from the microprocessor system.

For a typical operation, the correlation of the enabled reference subarray binary pattern of pixels from unit 84 over signal line 86 is compared with the other chosen subarray binary patterns rendered from the gray level slicer 76 over signal line 91 in accordance with the accessing address information of the track window counter 80. The comparison of the binary signals is made in the exclusive OR 160. Synchronization with the pixel indexes may be accomplished with the clock signal 100 and AND gate 162. For each comparison of respectively indexed pixels of the correlating subarrays which are mismatched, the counter 164 is incremented by one; and likewise, for each comparison which is matched the count in the counter is sustained. After all of the respectively indexed pixels of the correlating subarrays have been compared, the count in the counter 164 is provided to the microprocessor system over signal lines 96 for further processing therein, and the counter 164 is reset to a predetermined value, preferably zero, by the signal line 98. And the process is repeated for each subarray on which a correlation is to be performed.

Figure 12A:
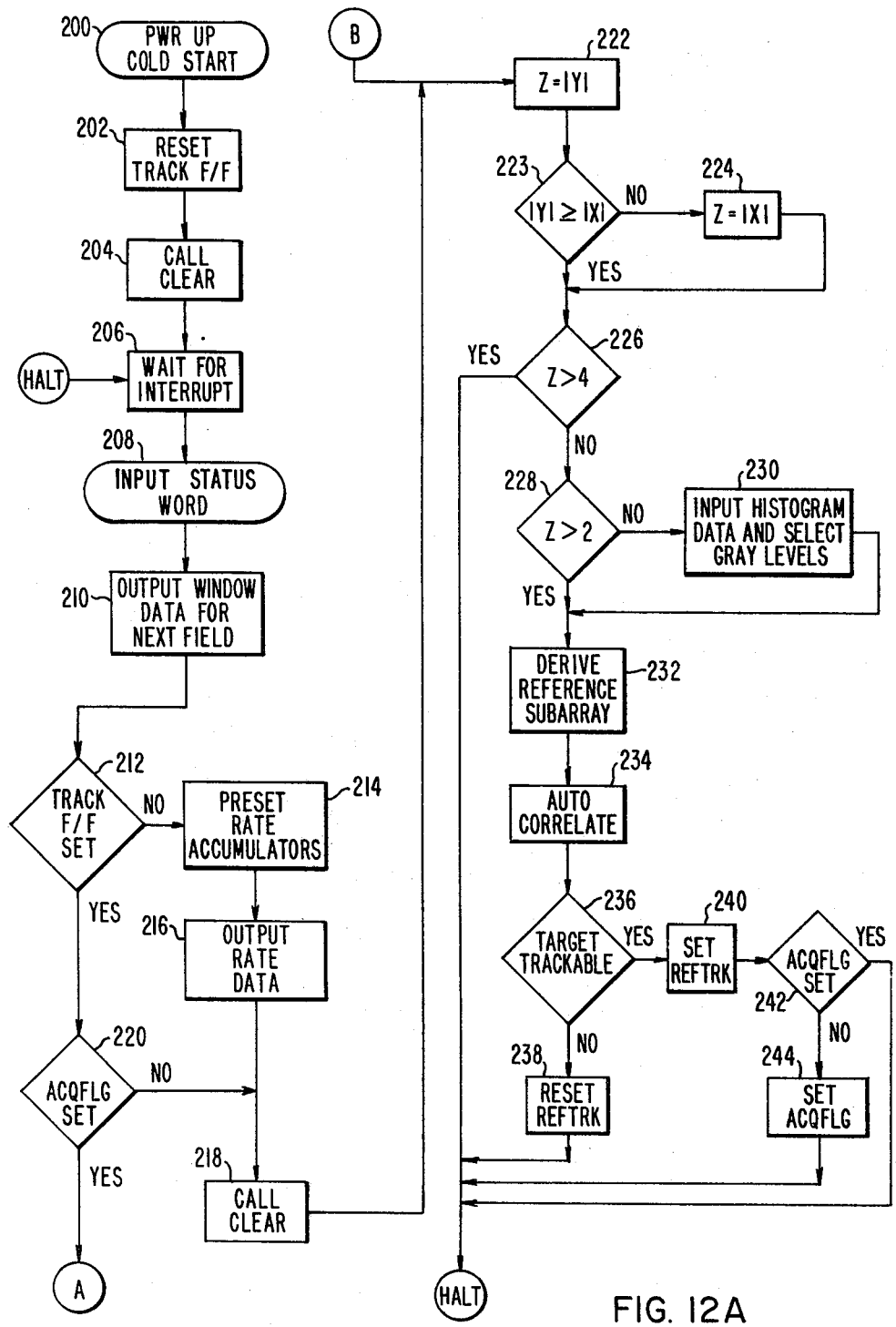
FIGS. 12A, 12B, and 13 are representative functional flow charts which typify the type of instructional programming and sequential operation thereof of the PROM and related microprocessor system in connection with the embodiment as shown in FIG. 3.

As has been described above in connection with the embodiment of FIG. 3, the microprocessor 40 in conjunction with the programmed instructions of the PROM 44 centrally coordinates the operations of the electronic tracking unit 28. The operational flow charts of FIGS. 12A and 12B typify the instructional programming of the PROM 44 and the sequencing of processing thereof. Referring to FIG. 12A, upon power up of the electronic tracking unit 28, an electronic RESET signal is applied to one input of the microprocessor 40 as shown in the embodiment of FIG. 3. This action disables all interrupts and sets the program counter of the microprocessor 40 internally to zero. Upon release of the RESET signal, an address jump may be made to a cold start subroutine in the PROM 44, which is designated by the block 200 in the flow chart of FIG. 12A.

During the cold start subroutine, a track F/F may be reset as shown in block 202, and thereafter, all position data in the RAM 48 may be cleared, as designated by block 204. In addition, all flag words may be set to zero, the window data to produce a track window at the raster scan center may be set, and all the computational data in the RAM 48 may also be cleared. All of the above steps may constitute a CLEAR subroutine. Finally, the stack pointer of the microprocessor 40 may be set and the interrupts enabled.

Another start, denoted as warm start for the purposes of the present embodiment, is activated by the interrupt signal 116 which is input to a non-maskable TRAP input of the microprocessor 40; this action occurs just after the termination of the track window in the raster scan, which is tantamount to the storing of the pixel gray level information of the track window for a current video frame. Another address jump in the PROM 44 from the TRAP entry point enters a subroutine where a status word is input from the I/O element 110, as denoted by the block 208. The status word may render such information as the field of view size, an electronic underscan, the status of the track F/F, the condition of an offset track, the selection of either an odd or even field, and the like, for example. Once the status word has been evaluated, the next block 210 is executed by the microprocessor to establish the coordinates of the track window data for the next video frame. Thereafter, the condition of the track F/F may be determined in the decisional block 212. If not set, the rate accumulators for controlling the tracking to the gimbal servos may be preset in block 214, and the data may be output through the I/O elements 106 and 108 in accordance with the successive execution of block 216. Thereafter, the CLEAR subroutine may again be called and executed by the instruction of block 218. Referring back to the decision of block 212, if the track F/F is set, it may next be determined, in decision block 220, if an acquisition flag, denoted as ACQFLG is set; if so, instruction execution may be continued at point A; else execution may be passed along to instructional block 218.

First time through the instructional sequence it is not expected that the track F/F or the acquisition flag will be set, therefore, instructional blocks 214, 216 and 218 may be executed and subsequent execution may occur at point B. The azimuth and elevation tracking errors for the gimbal servos may be denoted as X and Y, respectively, for the purposes of describing the operation in accordance with the programming sequence as shown in FIG. 12A. A temporary variable Z is used for identifying the maximum absolute value of the tracking errors X and Y. The instructional blocks 222, 223 and 224 may be used for these purposes resulting in the maximum absolute value of the tracking error as the variable Z, generally measured in pixels.

Next, it may be determined in decisional block 226 if the maximum absolute tracking error Z is greater than some first predetermined value, which may be four pixels for the present embodiment. If so, execution is halted until another interrupt occurs, as detected in block 206 previously described. If Z is less than the first predetermined value, it may again be tested against a second predetermined value, say two pixels, for example, in decisional block 228. If Z is less than the second predetermined value, the instructions of block 230 may next be executed. The instructions of block 230, which will be described in greater detail herebelow in accordance with the flow chart of FIG. 13, may select the gray level values for use in the gray level slicer 76 for forming the binary patterns of the pixels in the track window for subsequent correlation operations of the correlator 88.

As a result of the variable Z being greater than the second predetermined value, or after the execution of block 230, a reference subarray of pixels may be derived from the track window in accordance with the instructions of block 232. Next, autocorrelation may be performed in the binary correlator 88 with the binary pattern of the derived reference subarray and other predetermined subarrays in geometric relation to the reference subarray of the same track window. From the autocorrelations of block 234, an autocorrelation maximum value may be derived and stored for determining a reference subarray update, if necessary. In the decisional instruction block 236 next executed, it may be determined if the target is trackable; if not, the reference track REFTRK flag is reset in block 238, and the program execution may be halted until the next interrupt occurs. If the target is found trackable, the reference track flag may be set in instructional block 240, and it may next be determined if the acquisition flag is set in the decisional block 242. If the decision is positive, program execution may be halted and again reverted to block 206; if negative, the acquisition flag may be set in block 244 and program execution may again be halted awaiting the next interrupt at 206.

In general, on the first pass through the sequence of instructions as described in connection with FIG. 12A, the tracking errors X and Y may normally be preset to zero and the acquisition flag ACQFLG may be reset. Once set, the acquisition flag may only be reset by actions taken in other subroutines of the instructional programming. Beyond the first instruction sequence pass, the reference trackability flag REFTRK may be set or reset depending on the trackability of the newly-derived target pattern. During a subsequent interrupt, it may be determined in decisional blocks 212 and 220 that the program execution should continue at the point A which may be considered as the start of a track subroutine.

Figure 12B:
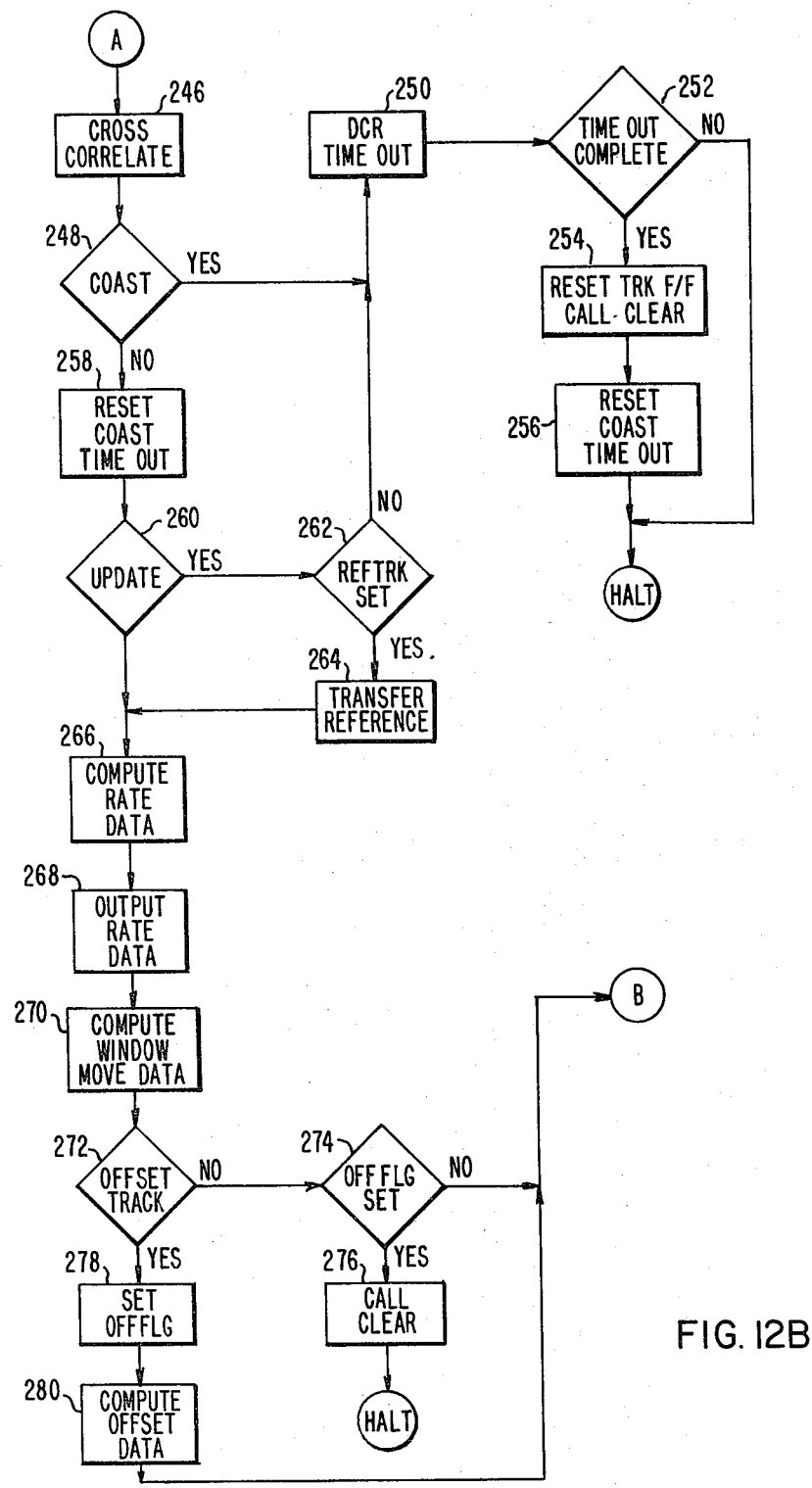

Referring to FIG. 12B then, and the instructional block 246, a cross-correlation is carried out utilizing the binary correlator 88 and the binary pattern of pixels in the reference subarray contained in the reference pattern RAM 84. Thereafter, the value of the best match correlation may be compared with a first threshold number which may be considered the coast threshold and if the coast threshold is exceeded by the best match cross-correlation value, as determined by the decisional block 248, a time-out may be initiated by instructional block 250 and be allowed to persist until either a newly-derived best match cross-correlation value is less than the coast threshold or the time-out is complete as determined by the decisional blocks 248 and 252, respectively. If the time-out is complete, track data may be cleared by the block 254. Simultaneously, the CLEAR subroutine may be executed clearing pertinent track data in the RAM 48. Next, the coast time-out may be reset and with the track F/F reset, the electronic tracker system may be reverted to manual track. Instructional execution may next be halted awaiting the next interrupt at block 206.

If the coast threshold is not exceeded during the same or subsequent interrupt execution as determined by 248, the coast time-out timer is reset in block 258 and the next test in decisional block 260 may be for update purposes. An update threshold may be derived from the auto-correlation execution of block 234 and may also be compared with the best match cross-correlation value of a current video frame. If the update threshold is exceeded by the best match cross-correlation value, a test may be made to determine if the REFTRK flag is set according to the decisional block 262. If REFTRK is reset, then an attempt may be made to update to a non-trackable target by reinstituting the coast subroutine starting at the instructional block 250. Conversely, if REFTRK is set, an update may be activated in block 264 wherein an update signal over line 102 may be transmitted to the reference pattern RAM's 84 to enable the other of the two memories 148 and 150 for use as the reference subarray pattern of pixels. Program execution may continue at block 266 as a result of either the decision of block 260 or the execution of block 264. In block 266, the rate tracking error data may be derived and subsequently output through the I/O elements 106 and 108 by the instructions of block 268. Thereafter, track window positioning data may be computed in block 270 which may result in a track window indexing movement in the raster scan to follow apparent target motions through the field of view of the sensor 22. Once this subroutine ends, an offset track subroutine may be entered starting at the decisional block 272.

An offset track may generally be initiated by an operator through the use of a joy stick or similar device on the operator's command panel. Once offset track is initiated, an offset track flag, denoted as OFFFLG, may be set activating the computations of offset data. Input command date from the joy stick, for example, may be entered into the microprocessor system through the I/O element 110. In general, the tracking system may perform an offset track only when the system is in track. If no offset track indication is provided as determined by 272, the offset flag may be tested in the decisional block 274. If the results of the decisional blocks 272 and 274 are both negative, the program execution jumps to the subroutine starting at B as shown in FIG. 12A. If, on the other hand, the offset flag is determined set by 274, the CLEAR subroutine may be executed and thereafter, the program execution may be halted until the next occurrence of an interrupt at 206. If an offset track command is initiated as determined by 272, the offset flag may be set in instructional block 278 and the resulting offset data may be computed in the block 280. Thereafter, program execution may be continued again at the subroutine starting at the point B as shown in FIG. 12A.

Figure 13:
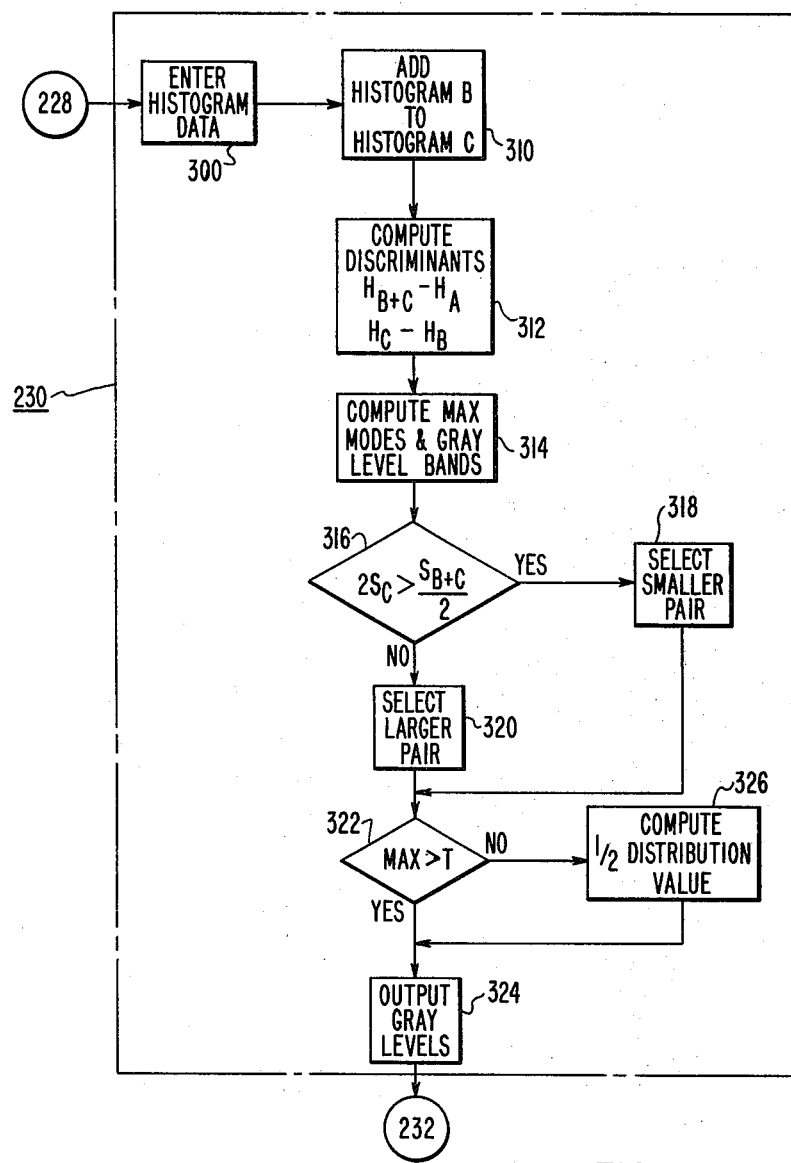

For a more complete understanding of how the selected gray level values may be derived, the instructions of block 230 will be described at this time in connection with a more detailed functional flowchart shown in FIG. 13. The subroutine of 230 may enter the histogram data into the microprocessor RAM 48, for example, via signal line 72 and bus 42 in accordance with the instructions of block 300. Next, in block 310, the pixel data of respective predetermined gray level values for the histograms B and C may be added together to form a composite histogram of B+C denoted as $H_{B+C}$. The histogram of the subarray A may be denoted as $H_A$. In the successive instructional block 312, the discriminates of the composite histograms of B+C and A, and of C and B may be computed. (Examples of the computations of one discriminant function by comparing the histograms of two subarrays is shown in the graphs of FIGS. 6A, 6B and 6C above.) In the next instructional block 314, the gray level bands of the maximum target modes may be determined for the two sets of discriminate functions.

For the purposes of the present embodiment, as has been described hereabove, the maximum target modes may be defined as those modes having a positive difference which contain the maximum number of pixels. The maximum mode values for the discriminate function between the histograms of C and B may be denoted as $S_C$ and the maximum mode value for the discriminate function of the histograms B+C and A may be denoted as $S_{B+C}$. It is understood that since the pixels of the subarray A have approximately four times the number of pixels in the subarray B+C. Some pixel weighting may be performed for the purposes of having an equitable comparison between these maximum target mode values. As shown in the decisional block 316, which may be executed next, a weighting factor of four may be instituted for the comparison of these values. As a consequence of the decision of block 316, gray level values may be selected from either the smaller mode value or the larger mode value for use as the target mode by the instructions of blocks 318 and 320, respectively.

Thereafter, in the decisional block 322, the maximum pixel number associated with the selected gray level band is compared to a predetermined threshold value and if greater than the threshold value, the expanded outer gray level limits may be output to the gray level slicer 76 on signal lines 78, for example, by the instructions of the block 324. Otherwise, a subroutine may be executed in block 326 during which the pixel distribution of the selected histogram from block 316 may be accumulated starting from a minimum predetermined gray level value, such as zero, for example, and continuing consecutively through the other predetermined gray level values until the accumulated pixel distribution reaches a predetermined number which may be one-half of the maximum number of pixels in the track window array. The predetermined gray level value k associated with the accumulation greater than occurrence may be used for the gray level slicer operation in forming the binary pattern of pixels for the track window array in block 76. This determined gray level value k may also be output to the block 76 over signal line 78 by the instructional block 324. At the end of execution of the instructions of block 230, execution may be continued at the block 232 according to the operational flowchart of FIG. 12A. Appendix 1 contains an assembly level language listing suitable for programming the functions of flow chart of FIG. 13 in the PROM 44 for processing by the microprocessor 40 as related to the preferred embodiment as shown in FIG. 3.

It is understood that the embodiments described in connection with FIGS. 8 through 11 and the operational flowcharts of FIGS. 12A, 12B and 13 in conjunction therewith have been supplied merely to facilitate a better understanding of the present invention as a whole and should not be used to limit the present invention in any way. Rather, the broad principles of the present invention should be construed in accordance with the scope and breadth of the following claims.

ISIS-II 8080/8085 MACRO ASSEMBLER, V2.0

```
LOC   OBJ          SEQ      SOURCE STATEMENT

1           NAME    GRAYS
                    2           PUBLIC  GSLICE,GOUT
                    3           EXTRN   BMOVE
                    4       ; AN ASSEMBLY LANGUAGE PROGRAM TO SIMULATE THE GRAY LEVEL
                    5       ; PROCESSOR IN THE BLUE SPOT TRACKER
0048          S     6  RAM     EQU     STACK+72
1400                7  EXADDR  EQU     1400H
1400                8  OUTER   EQU     EXADDR
1410                9  MID     EQU     EXADDR+16
1420               10  INNER   EQU     EXADDR+32
0068          S    11  ADDX    EQU     STACK+104
0027          S    12  MSUM0   EQU     STACK+39
0028          S    13  SUM1    EQU     STACK+40
0029          S    14  START0  EQU     STACK+41
002A          S    15  STOP0   EQU     STACK+42
002B          S    16  START1  EQU     STACK+43
002C          S    17  STOP1   EQU     STACK+44
002D          S    18  MSUMN   EQU     STACK+45
002E          S    19  STARTN  EQU     STACK+46
002F          S    20  STOPN   EQU     STACK+47
A800               21  GOUT    EQU     0A800H
0031          S    22  SAVESP  EQU     STACK+49
                   23          CSEG
                   24      ;
                   25      ; ROUTINE TO FORM DISCRIMINANTS
                   26      ;
0000 211014        27  GSLICE: LXI    H,MID        ;LOAD H,L WITH ADDRESS OF MID WINDOW
0003 E3            28          XTHL                ;EXCHANGE WITH TOP OF STACK
0004 223100   S    29          SHLD   SAVESP       ;SAVE SP RETURN ADDRESS
0007 212014        30          LXI    H,INNER      ;RELOAD H,L WITH ADDR OF INNER WINDOW
000A 114800   S    31          LXI    D,RAM        ;LOAD D,E WITH RAM START ADDRESS
000D 0E20          32          MVI    C,32         ;LOAD LOOP COUNTER
000F AF            33  ADDW:   XRA    A
0010 7E            34          MOV    A,M
0011 1F            35          RAR
0012 47            36          MOV    B,A
0013 23            37          INX    H
0014 E3            38          XTHL
0015 AF            39          XRA    A
0016 7E            40          MOV    A,M
0017 1F            41          RAR
0018 80            42          ADD    B
0019 23            43          INX    H
001A 12            44          STAX   D
001B 13            45          INX    D
001C 0D            46          DCR    C
001D C20F00   C    47          JNZ    ADDW
0020 2A3100   S    48          LHLD   SAVESP       ;RETURN ADDRESS TO STACK
0023 E3            49          XTHL
                   50      ;
                   51      ; ENTER INTERMEDIATE RESULTS IN RAM AT ADDX
                   52      ;
0024 214800   S    53          LXI    H,RAM
0027 116800   S    54          LXI    D,ADDX
002A 0E10          55          MVI    C,16
002C CD0000   E    56          CALL   BMOVE
                   57      ;
                   58      ; FORM DISCRIMINANTS
                   59      ;
002F 210014        60          LXI    H,OUTER
0032 114800   S    61          LXI    D,RAM
0035 0E20          62          MVI    C,32
0037 AF            63  DISC:   XRA    A
0038 7E            64          MOV    A,M
0039 1F            65          RAR
```

| LOC OBJ | SEQ | SOURCE STATEMENT | | |
|---|---|---|---|---|
| 003A 47 | 66 | MOV | B,A | |
| 003B 1A | 67 | LDAX | D | |
| 003C 90 | 68 | SUB | B | |
| 003D 12 | 69 | STAX | D | |
| 003E 13 | 70 | INX | D | |
| 003F 23 | 71 | INX | H | |
| 0040 0D | 72 | DCR | C | |
| 0041 C23700 C | 73 | JNZ | DISC | |
| | 74 | ; | | |
| | 75 | ; FORM GRAY LEVEL SETS | | |
| | 76 | ; | | |
| 0044 214800 S | 77 | LXI | H,RAM | ;DISCRIMINATOR START ADDRESS |
| 0047 CDD900 C | 78 | CALL | INIT | ;INITIALIZE |
| 004A CDE400 C | 79 | CALL | MODES | |
| 004D 78 | 80 | MOV | A,B | |
| 004E B7 | 81 | ORA | A | |
| 004F C40801 C | 82 | CNZ | EVAL | ;GOTO EVAL IF B=1 |
| 0052 3A2700 S | 83 | LDA | MSUM0 | ;STORE VALUES FROM FIRST PASS |
| 0055 322800 S | 84 | STA | SUM1 | |
| 0058 3A2900 S | 85 | LDA | START0 | |
| 005B 322B00 S | 86 | STA | START1 | |
| 005E 3A2A00 S | 87 | LDA | STOP0 | |
| 0061 322C00 S | 88 | STA | STOP1 | |
| 0064 215800 S | 89 | LXI | H,RAM+16 | |
| 0067 CDD900 C | 90 | CALL | INIT | |
| 006A CDE400 C | 91 | CALL | MODES | |
| 006D 78 | 92 | MOV | A,B | |
| 006E B7 | 93 | ORA | A | |
| 006F C40801 C | 94 | CNZ | EVAL | |
| 0072 3A2700 S | 95 | LDA | MSUM0 | ;MAX SUM PASS 2 |
| 0075 FE08 | 96 | CPI | 8 | |
| 0077 F27B00 C | 97 | JP | DISC0 | |
| 007A AF | 98 | XRA | A | |
| 007B 47 | 99 DISC0: | MOV | B,A | |
| 007C 3A2800 S | 100 | LDA | SUM1 | ;MAX SUM PASS 1 |
| 007F FE08 | 101 | CPI | 8 | |
| 0081 F28500 C | 102 | JP | DISC1 | |
| 0084 AF | 103 | XRA | A | |
| 0085 B0 | 104 DISC1: | ORA | B | |
| 0086 CA6800 C | 105 | JZ | NOMODE | ;ZERO FOR NO MODES |
| 0089 78 | 106 | MOV | A,B | ;INNER WINDOW SUM TO A |
| 008A 87 | 107 | ADD | A | |
| 008B 47 | 108 | MOV | B,A | ;INNER WINDOW SUM *2 |
| 008C B7 | 109 | ORA | A | |
| 008D 3A2800 S | 110 | LDA | SUM1 | |
| 0090 1F | 111 | RAR | | ;OUTER WINDOW SUM/2 |
| 0091 B8 | 112 | CMP | B | |
| 0092 F2A100 C | 113 | JP | OUTBIG | |
| 0095 3A2900 S | 114 | LDA | START0 | ;REPLACE VALUES |
| 0098 322B00 S | 115 | STA | START1 | |
| 009B 3A2A00 S | 116 | LDA | STOP0 | |
| 009E 322C00 S | 117 | STA | STOP1 | |
| 00A1 3A2C00 S | 118 OUTBIG: | LDA | STOP1 | |
| 00A4 47 | 119 | MOV | B,A | |
| 00A5 3E10 | 120 | MVI | A,16 | |
| 00A7 90 | 121 | SUB | B | |
| 00A8 87 | 122 | ADD | A | |
| 00A9 87 | 123 | ADD | A | |
| 00AA 87 | 124 | ADD | A | |
| 00AB 87 | 125 | ADD | A | |
| 00AC 4F | 126 | MOV | C,A | |
| 00AD 3A2B00 S | 127 | LDA | START1 | |
| 00B0 47 | 128 | MOV | B,A | |
| 00B1 3E10 | 129 | MVI | A,16 | |
| 00B3 90 | 130 | SUB | B | |
| 00B4 81 | 131 | ADD | C | |
| 00B5 C3D500 C | 132 | JMP | OUTG | |
| 00B8 216800 S | 133 NOMODE:LXI | | H,ADDX | |

```
LOC  OBJ        SEQ          SOURCE STATEMENT 0088 0610      134              MVI    B,16
008D 4E        135 LDIST:       MOV    C,M
008E 3A2700 S  136              LDA    MSUM0
00C1 81        137              ADD    C
00C2 FE40      138              CPI    64
00C4 F20100 C  139              JP     HAFWAY
00C7 322700 S  140              STA    MSUM0
00CA 23        141              INX    H
00CB 13        142              INX    D
00CC 05        143              DCR    B
00CD C28D00 C  144              JNZ    LDIST
00D0 04        145              INR    B
00D1 05        146 HAFWAY: DCR  B                   ;RANGE F TO 0
00D2 3EFF      147              MVI    A,0FFH
00D4 90        148              SUB    B
00D5 3200A8    149 OUTG:        STA    GOUT
00D8 C9        150              RET                 ;PROCESS DONE!!!
               151              ;
00D9 AF        152 INIT:        XRA    A            ;CLEAR ACCUMULATOR
00DA 322700 S  153              STA    MSUM0        ;SET SUM VALUES TO ZERO
00DD 322D00 S  154              STA    MSUMN
00E0 011000    155              LXI    B,0010H      ;KEY=0,LOOP COUNTER=16
00E3 C9        156              RET
               157              ;
               158              ; MAXIMUM MODE SUBROUTINE
               159              ;
00E4 7E        160 MODES:  MOV  A,M                 ;ENTER DIFFERENCE
00E5 07        161              RLC                 ;ROTATE LEFT THRU CARRY
00E6 D2F100 C  162              JNC    NEXT         ;JUMP IF POSITIVE(CY=0)
00E9 78        163              MOV    A,B          ;LOAD ACCUM WITH KEY
00EA B7        164              ORA    A
00EB C40801 C  165              CNZ    EVAL         ;IF KEY=1 CALL EVAL
00EE C30201 C  166              JMP    LOOPI        ;GO FOR NEXT DIFFERENCE
00F1 3A2D00 S  167 NEXT:        LDA    MSUMN        ;LOAD ACCUM WITH MODE SUM
00F4 86        168              ADD    M            ;ADD POSITIVE DIFFERENCE
00F5 322D00 S  169              STA    MSUMN        ;STORE NEW SUM
00F8 78        170              MOV    A,B          ;TEST KEY
00F9 B7        171              ORA    A
00FA C20201 C  172              JNZ    LOOPI        ;JUMP IF KEY=1
00FD 79        173              MOV    A,C          ;LOOP COUNTER TO ACCUM
00FE 322E00 S  174              STA    STARTN       ;STORE MODE START
0101 04        175              INR    B            ;SET KEY=1
0102 23        176 LOOPI:       INX    H
0103 0D        177              DCR    C            ;DECREMENT LOOP COUNTER
0104 C2E400 C  178              JNZ    MODES
0107 C9        179              RET                 ;MODE SEARCH DONE
               180              ;
               181              ; EVALUATION SUBROUTINE
               182              ;
0108 79        183 EVAL:        MOV    A,C          ;LOOP COUNTER TO ACCUM
0109 3C        184              INR    A            ;INCREMENT TO PRIOR VALUE
010A 322F00 S  185              STA    STOPN        ;STORE MODE STOP
010D 3A2700 S  186              LDA    MSUM0        ;LOAD ACCUM WITH OLD SUM
0110 57        187              MOV    D,A
0111 3A2D00 S  188              LDA    MSUMN        ;LOAD ACCUM WITH NEW SUM
0114 BA        189              CMP    D
0115 FA2A01 C  190              JM     GOBACK       ;OLD SUM LARGER
0118 3A2D00 S  191              LDA    MSUMN        ;REPLACE OLD VALUES WITH
011B 322700 S  192              STA    MSUM0        ;NEW VALUES
011E 3A2E00 S  193              LDA    STARTN
0121 322900 S  194              STA    START0
0124 3A2F00 S  195              LDA    STOPN
0127 322A00 S  196              STA    STOP0
012A 05        197 GOBACK: DCR  B                   ;RESET KEY=0
012B AF        198              XRA    A            ;RESET ACCUMLATED SUM
012C 322D00 S  199              STA    MSUMN
012F C9        200              RET                 ;GO FOR NEXT DIFFERENCE
0080        C  201              END    GSLICE       ;EXECUTION BEGINS WITH 'GSLICE'
```

| LOC | OBJ | SEQ | SOURCE STATEMENT |
|---|---|---|---|

PUBLIC SYMBOLS
GOUT    A A800    GSLICE C 0000

EXTERNAL SYMBOLS
BMOVE E 0000

USER SYMBOLS

| ADDW | C 000F | ADDX | S 0068 | BMOVE | E 0000 | DISC | C 0037 | DISC0 | C 007B | DISC1 | C 0085 | EVAL | C 0108 |
|---|---|---|---|---|---|---|---|---|---|---|---|---|---|
| EXADDR | A 1400 | GOBACK | C 012A | GOUT | A A800 | GSLICE | C 0000 | HAFWAY | C 00D1 | INIT | C 0009 | INNER | A 1420 |
| LDIST | C 00BD | LOOPI | C 0102 | MID | A 1410 | MODES | C 00E4 | MSUM0 | S 0027 | MSUMN | S 002D | NEXT | C 00F1 |
| N.MODE | C 00B8 | OUTBIG | C 00A1 | OUTER | A 1400 | OUTG | C 00D5 | RAM | S 0048 | SAVESP | S 0031 | START0 | S 0029 |
| START1 | S 002B | STARTN | S 002E | STOP0 | S 002A | STOP1 | S 002C | STOPN | S 002F | SUM1 | S 0028 | | |

I claim:

1. A video preprocessor for forming a binary pattern of gray level values for the picture elements (pixels) in a predetermined array of a frame of video gray level information generated from an electrical sensor, said preprocessor comprising:
   means for distributing the pixels of one selected pixel array within said predetermined pixel array of said video frame into a first gray level histogram based on a predetermined set of gray level values;
   means for distributing the pixels of at least one other selected pixel array within said predetermined pixel array of said video frame into a second gray level histogram based on said predetermined set of gray level values;
   means for selecting at least one gray level value of said predetermined set based on a discriminant function of said first and second gray level histogram distributions; and
   means for assigning one of two predetermined values to those pixels in said predetermined pixel array of said video frame which have a selected gray level value and for assigning the other of said two predetermined values to those pixels in said predetermined pixel array of said video frame which have an unselected gray level value, whereby a binary pattern of gray level values are formed for the pixels in the predetermined pixel array of said video frame.

2. The video preprocessor in accordance with claim 1 wherein the one and at least one other selected pixel arrays within the predetermined pixel array are disjoint, one being an inner pixel array and the at least one other being the annulus pixel array of said inner pixel array within the predetermined pixel array.

3. The video preprocessor in accordance with claim 2 wherein the means for selecting the at least one gray level value includes:
   means for subtracting the pixel distributions of corresponding gray level values of the histograms of the selected inner and annulus pixel arrays to form a composite histogram of gray level values;
   means for identifying groups of consecutive gray level values of said formed composite histogram which have pixel difference values of one polarity;
   means for selecting at least one identified group of consecutive gray level values which has a maximum pixel difference value with respect to the pixel difference values of said other identified groups; and
   means for governing the assigning means based on said selected at least one identified group of consecutive gray level values.

4. The video preprocessor in accordance with claim 3 including means for extending the consecutive gray level values of the selected at least one identified group of consecutive gray level values by including all of the consecutively increasing and decreasing gray level values on either side of the selected at least one identified group which have a pixel difference value in the composite histogram of substantially zero.

5. The video preprocessor in accordace with claim 3 wherein the subtracting means subtracts the pixel distribution of the histogram formed for the selected annulus array from the pixel distribution of the histogram formed for the selected inner array in accordance with corresponding gray level values to form the composite histogram; wherein the identifying means identifies the groups of consecutive gray levels which have positive pixel distribution difference values; and wherein the selecting means selects the at least one identified group which has a maximum positive pixel distribution difference value.

6. The video preprocessor in accordance with claim 3 including means for testing the determined maximum pixel difference value against a predetermined threshold value; and means, conditionally governed by the results of said testing means, to accumulate the pixels of the pixel distribution of the composite histogram starting at an initial gray level value and continuing consecutively through increasing gray level values until the accumulative number of pixels is greater than a predetermined number of pixels, the predetermined gray level value at said greater than occurrence being the selected gray level value for governing the assigning means.

7. The video preprocessor in accordance with claim 6 wherein the accumulating means accumulates pixels of the composite histogram starting at a zero predetermined gray level value and continuing consecutively through increasing predetermined gray level values until the accumulative number of pixels is greater than one-half the maximum number of pixels in the predetermined pixel array, the predetermined gray level value at said greater than occurrence being the selected gray level value for governing the assigning means.

8. A binary correlation video tracker including an electro-optical sensor for generating sequentially a plurality of frames of video gray level information of its field-of-view, an optical system operative to guide the line-of-sight of a predetermined target image to within the field-of-view of said sensor, and a tracking servo means, governed by at least one tracking error, to control the guidance of said optical system, said binary correlation video tracker further comprising:
   means for forming a binary pattern of values for the picture elements (pixels) in a predetermined pixel array of each of said plurality of frames of video gray level information generated by said sensor, said forming means further including:

means for distributing the pixels of one selected pixel array within said predetermined pixel array of each of said video frames into corresponding first gray level histograms based on a predetermined set of gray level values;

means for distributing the pixels of at least one other selected pixel array within said predetermined pixel array of each of said frames into corresponding second gray level histograms based on said predetermined set of gray level values;

means for selecting at least one gray level value of said predetermined set for each frame of video gray level information based on a discriminant function of the respectively corresponding first and second gray level histogram distributions; and means for assigning one of two predetermined values to selected pixels in said predetermined pixel array of each of said video frames said selected pixels having a selected gray level value corresponding to the video frame in which they are contained; and for assigning the other of said two predetermined values to the unselected pixels in said predetermined pixel array of each of said video frames;

means for selecting a reference subarray binary pattern of pixels from the predetermined pixel array of one frame of video gray level information;

means for correlating the formed binary pattern of said reference subarray with the formed binary patterns of the predetermined pixel arrays of generated video frames subsequent said one frame based on a binary correlation coefficient function; and means for generating said at least one tracking error based on the results of said binary pattern correlations of said correlating means.

9. A binary correlation video tracker in accordance with claim 8 wherein the correlating means includes means for cross-correlating the formed binary pattern of the reference subarray with formed binary patterns of other subarrays of the predetermined pixel array of another video frame, which is generated subsequent the one frame, to identify another reference subarray and position thereof in the predetermined pixel array of said another video frame, a position difference between the reference and another reference subarrays in the predetermined array being used to generate the at least one tracking error by the tracking means.

10. A binary correlation tracker in accordance with claim 9 wherein the correlating means further includes a means for autocorrelating the formed binary pattern of the reference subarray with the formed binary patterns of predetermined other subarrays in the predetermined array of the one video frame and for autocorrelating the formed binary pattern of the identified another reference subarray with the formed binary patterns of predetermined other subarrays of the predetermined pixel array of the same video frame; and wherein for each video frame, a maximum autocorrelation value is rendered as a result of said autocorrelation.

11. A binary correlation tracker in accordance with claim 10 wherein all pixel subarrays are similar in area, the pixels being indexed commonly in each of the subarrays; and wherein the autocorrelation and cross-correlations are performed by their respective means by comparing the binary values of respectively indexed pixels of the subarrays and accumulating dissimilarities as a measure of binary correlation.

12. A binary correlation tracker in accordance with claim 10 wherein all pixel subarrays are similar in area, the pixels being indexed commonly in each of the subarrays; and wherein the autocorrelations and cross-correlations are performed by their respective means by comparing the binary values of respectively indexed pixels of the subarrays and accumulating similarities as a measure of binary correlation.

* * * * *